United States Patent [19]

Heilman et al.

[11] 4,097,448

[45] Jun. 27, 1978

[54] THERMOSETTABLE EPOXIDE-POLYANHYDRIDE COMPOSITIONS

[75] Inventors: William J. Heilman, Houston, Tex.; Frank C. Peterson, Joplin, Mo.; Mical C. Renz; Leslie P. Theard, both of Houston, Tex.

[73] Assignee: Gulf Oil Corporation, Pittsburgh, Pa.

[21] Appl. No.: 774,379

[22] Filed: Mar. 4, 1977

[51] Int. Cl.$^2$ .................... C08K 7/14; C08L 63/00
[52] U.S. Cl. .................... 260/42.18; 260/42.28; 260/836; 260/837 R
[58] Field of Search .................... 260/836, 837, 42.18, 260/886

[56] References Cited

U.S. PATENT DOCUMENTS

| | | | |
|---|---|---|---|
| 3,306,954 | 2/1967 | Moore | 260/886 |
| 3,453,246 | 7/1969 | Heilman et al. | 260/836 |
| 3,514,419 | 5/1970 | Darlow | 260/836 |
| 3,579,487 | 5/1971 | Hazen et al. | 260/836 |
| 3,594,354 | 7/1971 | Hazen et al. | 260/836 |
| 3,637,904 | 1/1972 | Barie et al. | 260/836 |
| 3,717,557 | 2/1973 | Peterson | 260/836 |
| 3,852,236 | 12/1974 | Heilman | 260/836 |
| 3,997,499 | 12/1976 | Heilman et al. | 260/836 |
| 4,017,453 | 4/1977 | Heilman et al. | 260/42.18 |

Primary Examiner—Paul Lieberman

[57] ABSTRACT

A homogeneous mixture of a polyanhydride and an epoxy compound is prepared by the copolymerization of an olefinically unsaturated monomer capable of polymerization by free-radical means with an olefinically unsaturated monoanhydride and an olefinically saturated polyanhydride in the presence of a saturated epoxy compound and an anhydride accelerator without substantial anhydride-epoxide cross-linking. As an example, reinforcing glass fibers are impregnated with a solution of styrene, maleic anhydride, styrene-maleic anhydride copolymer, phenyl glycidyl ether and 1-methylimidazole and the resin is thickened in situ by copolymerization of the styrene, maleic anhydride and styrene-maleic anhydride copolymer to form a moldable, homogeneous mixture of styrene-maleic anhydride copolymer, phenyl glycidyl ether, 1-methylimidazole and reinforcing glass fibers.

19 Claims, No Drawings

THERMOSETTABLE EPOXIDE-POLYANHYDRIDE COMPOSITIONS

In our U.S. patent application Ser. No. 590,460, filed June 26, 1975, we described the preparation of homogeneous, heat curable, resin mixtures by copolymerizing an olefinically unsaturated monomer capable of polymerization by free-radical means with an olefinically unsaturated monoanhydride in the presence of an epoxide composition and an anhydride accelerator without the occurrence of substantial anhydride-epoxide reaction. In this prior application the epoxide composition consisted of at least 50 percent, determined as epoxy equivalents, of a polyepoxide with the remainder being a monoepoxide. In the present invention we have discovered that the homogeneous, heat curable, resin mixtures can also be prepared in the same manner as described in Ser. No. 590,460, but utilizing an epoxide composition in which the majority or all of the epoxy equivalents are provided by a monoepoxy compound, with a polyepoxide providing less than 50 percent of the epoxy equivalents.

This homogeneous resin mixture is a substantially noncross-linked thermosettable composition which can be heat cured to a hard, infusible resin through the reaction of the anhydride groups and the epoxy groups. In an application of this invention a solution of an unsaturated monoanhydride such as maleic anhydride, an olefinically unsaturated monomer which is capable of polymerization by free-radical means such as styrene, a polyanhydride such as preformed styrene-maleic anhydride copolymer, an anhydride accelerator such as 1-methylimidazole and a saturated monoepoxide such as phenyl glycidyl ether is intermixed with reinforcing fibers such as chopped glass fibers and an inert filler. This soft, sticky mass cannot be handled or molded. By our invention it is thickened in a first stage polymerization reaction to a non-tacky, handleable intermediate composition which is suitable for fabrication in a second stage polymerization reaction to a desired product of superior properties.

In this first stage reaction to prepare the thickened intermediate compound, the olefinic double bonds of the olefinically unsaturated components are interreacted in situ by free radical initiation, preferably by a chemical free radical initiator in the reaction mixture, into polyanhydride molecules which are homogeneously intermixed with the other resin components. This first stage reaction is carried out at conditions at avoid substantial reaction of the anhydride and epoxy groups. In the second stage reaction the anhydride and epoxy groups in the intermediate compound are interreacted under the influence of heat and the anhydride accelerator to form a rigid, thermoset resin product having excellent physical, chemical and electrical properties.

The olefinically unsaturaged monomer such as styrene also functions in the initial resin mixture as a solvent for the other resin components. Since this olefinically unsaturated monomer is reacted in the first stage copolymerization reaction, the intermediate composition can be prepared with no component of substantial volatility, which, if present, would interfere with proper second-stage curing or with storage stability of the intermediate composition. The thickened intermediate compound can range from a relatively hard, rigid material to a flexible material by adjustment of the resin formulation and appropriate control of the first stage reaction without substantial anhydride-epoxy reaction. The initial mixture of resin and reinforcing fiber can be spread out in a comparatively thin sheet for the thickening reaction. This not only makes possible better temperature control in the first stage reaction but also provides an intermediate product which is in a convenient form for further fabrication. Thus, the intermediate composition in sheet form can be used directly, after cutting into suitably sized pieces as desired, in compression molding. Also, a hardened intermediate composition in sheet form, hardened by appropriate choice of the resin formulation and not by substantial anhydride-epoxide reaction, can be reduced to granules or chips for use in injection molding or transfer molding fabrication. A nonreinforced intermediate resin product can be prepared by our procedure and pulverized for use in thermosetting powder coating or powder molding applications. In a further application of the resin formulation, glass fibers in the form of roving, tapes, and the like for use in filament winding can be coated with the liquid resin which is then solidified by the first-stage reaction for subsequent winding into the form of the desired product prior to anhydride-epoxy cure. The non-reinforced, unfilled formulations cure to a clear, transparent resin product, which evidences homogeneity comprising a single polymeric species. In contrast a cloudy, opaque product evidences heterogeneity.

The intermediate resin comprising a homogeneous mixture of polyanhydride molecules and molecules of the epoxy compound together with the anhydride accelerator is a thermosettable material which melts or softens and flows at an elevated temperature prior to curing through the anhydride-epoxy reaction. Since the anhydride-epoxy reaction is a cross-linking, thermosetting reaction, substantial anhydride-epoxy reaction in the first-stage cure results in a gelled intermediate. This gelation, which is the result of cross-linking, interferes with the proper resin flow that is required to produce the desired fabricated product in the second-stage cure. Therefore, the first stage cure must be carried out without substantial anhydride-epoxy reaction, that is, less anhydride-epoxy reaction in the first-stage reaction than that amount which would interfere with the resin flow which is required in the second stage fabrication. Some anhydride-epoxy reaction can be tolerated in the first-stage reaction without significantly interfering with second-stage fabrication but the maximum permissible amount will vary depending on the second-stage curing conditions and the nature of the final product. First-stage anhydride-epoxy reaction can be minimized or substantially eliminated by appropriate selection of the formulation including the free radical initiation and the anhydride accelerator, exclusion of undesirable impurities, adjustment of first-stage copolymerization conditions, and the like.

It is well known that the copolymerization reaction of styrene and maleic anhydride is a highly exothermic reaction. Since this copolymerization reaction is highly exothermic and since the anhydride-epoxy reaction is driven by heat, it is surprising that the first-stage exothermic copolymerization reaction can be carried out in accordance with our procedures without concurrently causing a substantial amount of the heat-sensitive, thermosetting reaction which would prevent resin flow in the second-stage cure or would interfere with successful second-stage molding. And it is particularly surprising that this reaction to the intermediate product can be carried out in the presence of the anhydride accelerator without a substantial amount of the flow-preventing, anhydride-epoxy reaction.

It is also well known that styrene and maleic anhydride preferentially polymerize into a styrene-maleic anhydride copolymer having substantially equal molar proportions of each component. However, we have surprisingly discovered that styrene and maleic anhydride can be reacted in our novel process to form a styrene-maleic anhydride copolymer having a styrene to maleic anhydride ratio substantially greater than one to one under conditions that the prior art indicates produce a one to one molar ratio. Since styrene is an excellent and inexpensive solvent, it may be desirable to incorporate an excess of this reactive monomer into the resin to obtain the desired resin fluidity and adjust the cross-link density in the cured resin, provided that the excess styrene does not significantly detract from the excellent properties of the finally cured product. As stated, it would be expected from existing knowledge that the maleic anhydride would react with styrene in equal molar proportions. It would also be expected that excess styrene would form property-degrading polystyrene molecules interspersed therein. It has been discovered that under the conditions at which the copolymerization is carried out, excess styrene attaches to styrene-maleic anhydride copolymer by graft polymerization in the form of relatively short graft branches that do not cause a significant degradation of the properties of the fully cured resin. Due to this graft polymerization, an initial resin solution containing a substantial molar excess of styrene can be utilized without the formation of sufficient polystyrene to degrade or cloud the resin product.

In preparing a styrene-maleic anhydride copolymer in situ in admixture with a saturated epoxy compound by the copolymerization of styrene and maleic anhydride, we have found that the presence of preformed styrene-maleic anhydride copolymer is preferred in the starting resin solution in addition to the styrene and maleic anhydride monomers due to the beneficial effect in the overall properties of the fully cured product. This preformed polyanhydride provides a nucleus for styrene and maleic anhydride addition, including styrene grafting, in a more controlled reaction. The presence of preformed polyanhydride also exercises a beneficial control of the free radical reaction and reduces the amount of the styrene-maleic anhydride copolymer to be produced by the highly exothermic reaction of styrene with maleic anhydride in order to obtain the requisite anhydride-epoxy cross-link density, thereby reducing the overall amount of heat generated by this reaction. This reduction in the generation of heat in the thickening reaction is enhanced by the fact that the graft reaction of styrene to the styrene-maleic anhydride copolymer generates much less heat than the reaction of styrene with maleic anhydride. The presence in the resin formulation of the preformed polyanhydride, the reinforcing fiber, the filler and other components that are used in the formulation also moderates the temperature rise in the reacting mixture by absorbing some of the heat generated in the reaction.

Styrene-maleic anhydride copolymers are solids. The room temperature (25° C.) solubility in styrene of an equimolar copolymer of styrene and maleic anhydride is very low. Copolymers of styrene and maleic anhydride having styrene to maleic anhydride ratios that are greater than one to one can be prepared by special techniques. The room temperature solubility in styrene of a copolymer having a styrene to maleic anhydride ratio of two to one is also very low. When the styrene-maleic anhydride copolymer possesses large styrene to maleic anhydride ratios, the copolymer possesses a significant solubility in styrene. However, a large ratio of styrene to maleic anhydride in the copolymer lowers the quality of the resulting thermoset product for many uses by lowering its cross-link density. Similarly, a large proportion of solvent styrene in the initial reaction mixture can lower the quality of the thermoset product by producing a heterogeneous, polystyrene-containing product, by lowering its cross-link density and the like.

Maleic anhydride is also a solid. At room temperature styrene-maleic anhydride solutions can be prepared having a maximum solids content of about 22 weight percent. Larger amounts of maleic anhydride can be dissolved in the styrene at an elevated temperature, but the excess maleic anhydride will precipitate out to a 22 percent content when the solution is cooled to room temperature. However, we have discovered that if the solution of styrene and maleic anhydride is moderately heated to dissolve more than 22 percent maleic anhydride and if the solid styrene-maleic anhydride copolymer is dissolved into the warmed solution, the maleic anhydride in excess of the original 22 percent will stay in solution when the solution is cooled to room temperature.

We have also discovered that a styrene-maleic anhydride solution at a slightly elevated temperature which contains an excess of maleic anhydride over that which is soluble at room temperature will dissolve a surprising excess of a low styrene content styrene-maleic anhydride copolymer over the amount which is soluble in styrene alone at that temperature or in a styrene-maleic anhydride solution containing a lesser amount of maleic anhydride at that same temperature. The overall result is a surprising reciprocal solubility effect, that is, the solid maleic anhydride enhances the solubility of the solid styrene-maleic anhydride copolymer and the solid styrene-maleic anhydride copolymer concurrently enhances the solubility of the solid maleic anhydride.

We have made a further advantageous discovery. That is, the presence of the copolymer solubilizing maleic anhydride monomer provides the surprising effect of producing a resin solution having a substantially lower room temperature viscosity than possessed by a styrene solution of a styrene-maleic anhydride copolymer having the same weight proportion of these two components but no maleic anhydride. Thus, a solution prepared at an elevated temperature from equal amounts by weight of styrene and a two to one styrene-maleic anhydride copolymer will be a putty-like, semi-solid at room temperature. However, this equal parts by weight solution of styrene and this copolymer can be prepared at a lower temperature with maleic anhydride as a solubility enhancer to form a solution having a room temperature viscosity of less than 1,000 cps. This surprising effect results in a plurality of desirable advantages, that is, a room temperature resin solution having a very high solids content, a relatively low overall styrene content, a high fluidity, and the like. These discoveries regarding solution properties have enabled us to optimize proportions with regard to cost, polymerization characteristics and product properties.

Since the first stage copolymerization reaction is a free radical reaction, suitable free radical initiation is used to obtain the desired copolymerization. The copolymerization reaction is preferably carried out at a moderately elevated temperature. At a low temperature the free radical reaction is inconveniently slow and at a high temperature the anhydride-epoxy cross-linking reaction becomes excessive. Since the first-stage reaction is exothermic, the internal resin temperature will rise during the reaction above the temperature of the resin at which the reaction is initiated. This first stage reaction can successfully be carried out at a maximum internal temperature of the resin as determined by an embedded thermocouple of about 150° C., preferably about 125° C. and most preferably about 100° C. At the higher internal temperatures short reaction times are insured by using particularly active free radical initiators, preferably accompanied by rapid heat up and cool down of the resin mixture in order to minimize the cross-linking reaction. Although the thickening reaction can be initiated at a resin temperature below room temperature, this procedure is less desirable than the initiation of the reaction at about room temperature or more preferably at a moderately elevated temperature.

Suitable free radical initiation includes the use of chemical free radical initiators, ionizing radiation, ultraviolet radiation, and the like. Suitable chemical free radical initiators include the organic peroxides such as methyl ethyl ketone peroxide with vanadium neodecanoate or cobalt naphthenate as a promotor, dicyclohexyl peroxydicarbonate, t-butyl peroxyneodecanoate, t-butyl peroxypivalate, and the like; azo compounds such as 2,2'-azobis(2,4-dimethyl-4-methoxyvaleronitrile), 2,2'-azobis (2,4-dimethylvaleronitrile), 2,2'-azobis(isobutyronitrile), 2-t-butylazo-2-cyano-4-methoxy-4-methylpentane, and the like. It is of critical significance that the selection of the anhydride accelerator be carefully correlated with the free radical initiation to insure that the desired copolymerization reaction occurs without substantial cross-linking. For example, if a chemical free radical initiator is used, the anhydride accelerator must be substantially inactive during the copolymerization reaction at the temperature and for the time that the free radical reaction is carried out. Thus, when a chemical free radical initiator is used, it should have a relatively short half-life at a moderate temperature and be used in suitable amount to cause an a active copolymerization reaction at a moderate temperature. In contrast with the activity of the free radial initiation, the anhydride accelerator will possess a low activity for the anhydride-epoxy reaction. That is, low activity as applied to the anhydride accelerator is a relative term which is applied as a contrast with the substantially greater activity of the free radical initiation at the same conditions. Furthermore, the selection of the chemical free radical initiator must be correlated with the anhydride accelerator to avoid any interference of the effect of the free radical initiator by the anhydride accelerator. The peroxide initiators appear to be more susceptible to a deactivating effect by some anhydride accelerators.

The compositions comprise an olefinically unsaturated monomeric compound containing one olefinic double bond capable of polymerization by free radical means as its only functional group. As used herein and in the claims, functional group is used to mean any group which is reactive at the conditions and in the environment involved in the first-stage copolymerization. Olefinically unsaturated monomeric compounds which polymerize by a free radical mechanism are well known in the art and are generally terminally unsaturated compounds which contain a substituent directly connected to the double bond that activates the double bond for polymerization by effecting a net electron withdrawal from the olefinic double bond. Examples of useful olefinically unsaturated monomers which are capable of polymerization by free radical means include vinyl substituted mononuclear aromatic compounds such as styrene, ring substituted chloro-, bromo- or lower alkyl styrene, such as p-chlorostyrene, 3-bromostyrene, vinyl toluene, and the like, but not the $\alpha$ or $\beta$-substituted styrene such as $\alpha$-methylstyrene and $\beta$-bromostyrene. Also useful are lower alkyl acrylates and methacrylates, such as methyl methacrylate, methyl acrylate, ethyl acrylate, and the like; vinyl acetate, acrylonitrile; vinyl chloride; vinyl bromide; vinylidene chloride; diallyl phthalate; and the like. Also useful as -alkenes, olefinically unsaturated monomeric compounds are alkenes, preferably 1-alienes, and halogen-substituted, preferably chloro-substituted, alkenes having from 6 to 18 carbon atoms. Examples of suitable alkenes include 1-hexene, 2-methylpentene-1,5-chlorohexane-1, cyclohexene, 5-decene, 1-octadecene, and the like. As used herein, the expression lower alkyl refers to alkyl having one to four carbon atoms, inclusive.

The unsaturated monoanhydride which can be used in making the intermediate composition by copolymerization includes maleic anhydride, chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride chloromethylmaleic anhydride, bromophenylmaleic anhydride, itaconic anhydride, and the like.

The preformed polyanhydride which can be used in making the molding composition is the copolymer of an olefinically unsaturated monomer which is capable of free radical polymerization as described and the described unsaturated monoanhydride. For example, useful polyanhydrides include the copolymer of styrene and maleic anhydride having a ratio of styrene to maleic anhydride from about 1:1 to about 10:1, preferably from about 1:1 to about 3:1, and most preferably about 2:1, and having an average between two and about 500, preferably between two and about 200 repeating units, and the like. Also the preformed polyanhydride can be the equimolar copolymer of the unsaturated monoanhydride as described and one or more two to 20 carbon, preferably two to 10 carbon, 1-alkenes or halogen-substituted 1-alkenes having an average of two to about 500, preferably two to about 200 repeating units. Suitable 1-alkenes include ethylene, vinyl chloride, 1-propene, 1-butene, 1-pentene, 1-hexene, 1-heptene, 1-octene, 1-nonene, 1-decene, 5-chlorohexene-1, 1-undecene, 1-dodecene, 1-tridecene, 1-tetradecene, 1-octadecene, 4-methyl-1-heptene, and the like.

A saturated monoanhydride can replace a part of the preformed polyanhydride, preferably no greater than 50 percent measured in anhydride equivalents. Since the saturated monoanhydride may reduce the cross-link density of the fully cured product with a concomittant effect on its properties, it is less preferred than the polyanhydride for this reason. The preformed polyanhydride and the saturated monoanhydride comprise the saturated anhydride component. Suitable saturated monoanhydrides include phthalic anhydride, tetrahydrophthalic anhydride, hexahydrophthalic anhydride, methyltetrahydrophthalic anhydride, dodecenylsuccinic anhydride, chlorendic anhydride, a mixture of methyl bicyclo (2.2.1)-heptane-2,3-dicarboxylic anhydride isomers (Nadic methyl anhydride), mixtures thereof, and the like.

The saturated monoepoxide which is used in forming the molding compound herein is a liquid or solid at room temperature (20–25° C.) having between three and about 20 carbon atoms, preferably between three and about 12 carbon atoms, per molecule. The lower molecular weight liquid monoepoxides that are useful herein will also contribute a solvent effect to the resin mixture in addition to that provided by the olefinically unsaturated monomer. When the intermediate composition that is made in accorcance with the invention herein is to be stored for a significant period of time prior to the final curing, it is preferred that only an epoxide composition of relatively low volatility be used in the resin formulation.

The saturated monoepoxide can suitably be an aliphatic, cycloaliphatic, aromatic or mixed aliphatic-aromatic monoepoxide consisting of hydrogen atoms, carbon atoms and the one oxygen atom. The saturated monoepoxide can also be an aliphatic, cycloaliphatic, aromatic or mixed aliphatic-aromatic epoxy-containing ether or epoxy-containing ester consisting of hydrogen atoms, carbon atoms and the epoxy and ether or ester oxygen atoms. These saturated monoepoxides can further contain one or more halogen atoms, preferably chlorine atoms. Mixtures of two or more of these saturated monoepoxy are available both as 1,2-epoxy compounds in which the epoxy group is located in a terminal position in the molecule and as compounds in which the epoxy group is in an internal position in the molecule.

Saturated monoepoxides which are useful in preparing the moldable resin compositions include 1,2-epoxy hexane; 1,2-epoxy decane; 1,2-epoxy-7-propyl decane; 1,2-epoxy dodecane; 1,2-epoxy octadecane; 1,2-epoxy eicosane; 7,8-epoxy hexadecane; 3,4-epoxy hexane; 2,3-epoxy-2,3-dimethylbutane, and the like. Also useful in preparing these moldable resin compositions are 2,3-epoxy-2-phenylhexane; cyclohexane oxide; epoxycyclohexane; styrene oxide; epoxy isopropylbenzene, and the like. The group of epoxy-containing ethers which are useful includes 1,2-epoxy-2phenoxypropane; 1,2-epoxy-2-butoxypropane; methyl glycidyl ether; butyl glycidyl ether; octyl glycidyl ether; 2-propyloctyl glycidyl ether; phenyl glycidyl ether; isopropyl glycidyl ether; octadecyl glycidyl ether; amyl glycidyl ether; tolyl glycidyl ether; naphthyl glycidyl ether; and the like.

The group of epoxy containing esters which are useful includes glycidyl benzoate; glycidyl p. methyl benzoate; glycidyl acetate; diacetate of monoglycidyl ether of glycerol; dipropionate of the monoglycidyl ether of glycerol; glycidyl propionate; glycidyl methyl maleate; glycidyl stearate; methyl 1,2-epoxypropionate; butyl 1,2-epoxypropionate; glycidyl caprolate, and the like. Useful halogen-substituted saturated monoepoxides of the above groups include epichlorohydrin; epibromohydrin; 2,3-epoxy-2,4-dimethyl-4-chlorobutane; 1,2-epoxy-3-chlorobutane; 1,2-epoxy-5-chlorodecane; chlorophenyl glycidyl ether; pentachlorophenyl glycidyl ether; hexachlorocyclohexyl glycidyl ether, and the like.

The saturated monepoxide can be substituted, in part, by an epoxy resin in such amount that less than 50 percent of the epoxy equivalents in the total resin composition will be in the epoxy resin. That is, the ratio of epoxy equivalents in the saturated monoepoxy compound to the epoxy equivalents in the epoxy resin will be greater than 1:1.

The epoxy resin, also designated by the term polyepoxide, can be a single compound containing at least two epoxy groups in which case it is a diepoxide. It can also contain a variety of molecular species having a varying number of epoxy groups per molecule such that the average number of epoxy groups per molecule, that is the epoxy equivalent value, is specified. The epoxy equivalent of these polyepoxides comprising a mixture of molecular species is greater than one and is preferably about two or more, but will generally not be a whole integer. The epoxy equivalent value is obtained by dividing the average molecular weight of the polyepoxide by its epoxide equivalent weight (grams of the polyepoxide containing one gram equivalent of epoxide). The polyepoxide can be aliphatic, cycloaliphatic, aromatic, heterocyclic mixtures of these, saturated or unsaturated, and the like. It can be liquid or solid but must be soluble in the resin solution, or if not soluble capable of forming a homogeneous dispersion in the resin solution.

This broad class of epoxy resins which is useful is exemplified by reference to several of the better known types. The glycidyl group of epoxy resins is an important and useful type of epoxy resin. This group includes the glycidyl ethers, the glycidyl esters, the glycidyl amines, and the like. The glycidyl ethers include the glycidyl ethers of mononuclear polyhydric phenols, polynuclear polyhydric phenols and the aliphatic polyols. They may be single compounds or more commonly are a mixture of compounds, some of which are polymeric in nature. Illustrative of glycidyl ethers are the di- or polyglycidyl ethers of ethylene glycol; trimethylene glycol; glycerol; diglycerol; erythritol; mannitol; sorbitol; polyallyl alcohol; butanediol; hydrogenated bisphenol A; and the like.

The glycidyl ethers of polyhydric phenols include the glycidyl ethers of resorcinol; hydroquinone; catechol; pyrogallol; and the like as well as the glycidyl ethers of polynuclear phenols such as bisphenol A; bis(4-hydroxyphenyl)methane; and the like, and glycidyl ethers of the novolac resins such as bisphenol F and the like. The epoxy resins also include epoxidized olefins generally based on naturally occurring oils such as epoxidized soybean oil, epoxidized cotton seed oil, epoxidized castor oil, epoxidized linseed oil, epoxidized menhaden oil, epoxidized lard oil and the like, but also including epoxidized butadiene, epoxidized polybutadiene, and the like.

Additional useful epoxy resins are diglycidyl isophthalate; triglycidyl p-aminophenyl; diglycidyl phenyl ether; triglycidyl ether of trihydroxybiphenyl; diglycidyl ether of bisphenol PA; triglycidoxy-1,1,3-triphenylpropane; and the like. Further examples of epoxy resins are vinylcyclohexenedioxide; limonene dioxide; 2,2-bis(3,4-epoxycyclohexyl)propane; diglycidyl ether; bis (2,3-epoxycyclopentyl)ether; dicyclopentadiene dioxide; 3,4-epoxycyclohexylmethyl-(3,4-epoxy) cyclohexane carboxylate; and the like. Further information on these epoxy resins and additional examples of useful epoxy resins are discussed and/or referred to in HANDBOOK OF EPOXY RESINS by H. Lee and K. Neville, McGraw-Hill Book Co., 1967.

The presence of active hydrogen atoms such as found in water and in hydroxyl and carboxyl induce the anhydride-epoxy reaction and are particularly active in the presence of the anhydride accelerators. This is described in the above book by Lee and Neville, For this reason, it is essential particularly for significant shelf life of the intermediate composition that the presence of active hydrogen be minimized or substantially eliminated as a component or impurity in the initial resin mixture, particularly in the form of water, carboxyl or hydroxyl, or in the anhydride accelerator. This is accomplished by assuring that the initial anhydride reactants are substantially carboxyl-free and that all reactants are protected against contamination from atmospheric moisture. Predrying of one or more of the reactants may be desirable. Some polyepoxides such as the diglycidyl ether of bisphenol A contain reactive hydroxyl in each repeating unit. Hydroxyl is substantially eliminated in this instance by selecting a diglycidyl ether of bisphenol A which has a relatively low epoxy equivalent weight. As used herein, the expression "substantially free of active hydrogens" is used to mean that the reaction mixture contains insufficient active hydrogens to cause, in the presence of the anhydride accelerator, substantial anhydride-epoxy reaction in the first stage reaction.

In preparing the initial resin mixture the olefinically unsaturated monomer which is capable of polymerization by free radical means is used both as a reactant and as a solvent for the other resin components. It is used in an amount of about five to about 80 weight percent of the total resin components, preferably about 10 to about 60 weight percent of the resin mixture and most preferably about 15 to about 50 weight percent of the resin mixture. The molar ratio of the olefinically unsaturated monomer to the unsaturated monoanhydride that is conveniently used is from about 0.5:1 to about 8:1, preferably about 1:1 to about 4.5:1 and most preferably about 1:1 to about 3:1. For optimum properties in the fully cured product using styrene and maleic anhydride, a ratio of about 1:1 to about 3:1 is preferred, while a much higher ratio can be effectively used when methyl methacrylate and maleic anhydride are the copolymerization reactants, In contrast certain of the olefinically unsaturated monomers, such as the alkenes, will react with the unsaturated monoanhydrides in about a 1:1 molar ratio; therefore, these components are preferably used in this ratio. Thus it is noted that the preferred relative proportion of reactants depends upon the specific reactants used as well as the desired product properties.

The unsaturated monoanhydride is preferably used with a saturated polyanhydride as described. The anhydride equivalent ratio of the unsaturated monoanhydride to the sum of the unsaturated monoanhydride and the saturated anhydride component can suitably be as low as about 0.2:1, preferably as low as about 0.4:1 and most preferably as low as about 0.5:1; and as high as about 1:1, preferably as high as about 0.9:1 and most preferably as high as about 0.8:1. The anhydride to epoxide equivalent ratio; that is the A/E ratio, is conventionally used to express the relative proprtions of the anhydride groups and the epoxy groups present in a resin mixture, particularly when mixtures of molecules of different sizes in the anhydride and epoxide components are involved. We have found that the A/E ratio can suitably be from about 0.1:1 to about 2.5:1, preferably from about 0.3:1 to about 1.5:1 and most preferably from about 0.5:1 to about 1.3:1.

The resin composition is preferably formed in sheets using a fiber glass reinforcement. Fiber glass in various forms is well known and commercially available for resin-fiber glass compositions. The fiber glass can be in the form of a woven glass fabric or randomly distributed glass fibers. When chopped glass fivbers are used, they can suitably range from about 3 mm. to about 50 mm. in length and preferably from about 5 mm. to about 25 mm. in length. Other fibrous material can be used as the reinforcement or core material in the form of randomly distributed particles, fibers, fluff, paper, woven fabric, and the like. This can be made from natural materials such as cellulose, including sisal, hemp, cotton and linen, asbestos, etc., or a synthetic such as nylon, polyester, polyolefin, and the like.

The resin compositions can contain constituents in addition to the monomers and core material such as pigments or dyes for coloring the finished product, plasticizers, fillers, and the like. The fillers provide the desirable function of reducing the cost of the final product without significantly reducing the physical properties and can improve certain properties such as fire resistance, arc resistance and the like. Suitable filler material includes powdered calcium carbonate, clay, sands, powdered metals such as aluminum and iron, metal oxides such as iron oxide, alumina, etc., powdered silica, wood flour, walnut shell flour and the like. The filler is preferably inert in the composition, that is, it should not react with any of the reactants or catalyze a reaction involving the reactants. Also a material such as fused silica can be added to the resin formulation to increase its viscosity can be added to the resin formulation to increase its viscosity prior to the thickening reaction. Other additives which can be used are a suitable mold release agent or a material such as poly(methylmethacrylate, finely ground polyethylene, finely ground polystyrene and the like to impart a low profile, that is, a smooth surface, to the molded product.

It may be desirable to incorporate in the initial mixture a non-reactive plasticizer or a reactive plasticizing monomer which possesses the ability to enhance the flow characteristics during molding. Such plasticizing components include epoxidized vegetable oils such as epoxidized soy bean oil, di-2-ethylhexyl phthalate, dioctyl phthalate, dihexyl phthalate, di-isooctyl phthalate, polyethylene glycols such as those having a molecular weight between 600 and 1,000, Nadic methyl anhydride, and the like.

As pointed out, polymerization of the double bond is highly exothermic. In view of this, care must be exercised in order that the material does not heat high enough in the first stage polymerization to cause a significant anhydride-epoxy, cross-linking reaction to a gel such that the intermediate resin will not properly melt or flow or cannot be easily molded. However, it may be desirable that the intermediate product contain some anhydride-epoxy bonding below the gelation stage to increase the melt viscosity of the resin when excessive fluidity during molding becomes a problem. When the fiber glass-resin mixture has been laid down in relatively thin sheets, the exothermic heat of reaction is more readily dissipated than when thick sheets are used. Furthermore, the rate of the first stage reaction and therefore the heat buildup can be partially controlled by control of the free radical initiation itself. Since chemical free radical initiators generate free radicals at different rates, polymerization can be controlled by an appropriate selection of the chemical initiator, the amount used, and the time and temperature of the polymerization reaction. If ionizing radiation is used, a reduction in the intensity of the radiation source will reduce the rate of heat buildup in the material.

In the first-stage polymerization reaction the olefinically unsaturated monomer is completely reacted to form an intermediate product which is substantially free of volatile components. This intermediate composition is dry and handleable, that is, it can be handled, cut and the like without sticking to the hands, shears, and the like, and is readily moldable. When styrene is used without filler or reinforcing fiber, a clear intermediate product is obtained which is indicative of a homogeneous material and the absence of polystyrene. Since polystyrene and styrene-maleic anhydride copolymers are mutually insoluble, their concurrent presence in the intermediate product would be indicated by opacity. This homogeneous intermediate product results in a homogeneous fully cured resin product. In contrast a non-homogeneous intermediate product would result in a non-homogeneous resin product with inferior properties. The complete insolubility of the fully cured resin product in methyl ethyl ketone also indicates the absence of polystyrene in the final product.

In preparing the reaction solution the unsaturated monoanhydride can be added to the ethylenically unsaturated monomer and stirred at a mildly elevated temperature, if necessary, until solution is obtained, next the olefinically saturated polyanhydride can be added with stirring until solution is obtained, then finally the epoxide can be added. Alternatively, all four components can be added together with stirring until solution is obtained or the epoxide can be added to the ethylenically unsaturated monomer and then the unsaturated monoanhydride and the saturated polyanhydride can be added. The anhydride accelerator and free radical initiator are generally added last, but prior to the first-stage reaction. Other procedures are also possible. In some instances one or more of the components may not be completely soluble in the solution. In this instance such component can be finely granulated, with the resin components then formed into a homogeneous, liquid dispersion or mixture, rather than a true solution. As a result of the fineness of the particles and the thoroughness of the dispersion, the mixture will function in the process similar to a true solution of the reacting components. The pigments, catalysts, filler and other optional components are then introduced and then the mixture can be thickened by copolymerization to form the intermediate compound, such as sheet molding compound.

The term sheet molding compound is a designation of the Society of the Plastics Industry for resin-fiber reinforced, thermosetting composition in sheet form which is designed for compression molding. This molding compound can be formed as a sheet in a continuous process by depositing dry, chopped glass fiber moving between resin-coated plastic film such as polyethylene film. The resulting sandwich is then roller kneaded and compacted to uniformly interdisperse the resin and the glass fibers and to accomplish uniform thickness. This sticky, plastic contained mixture is then thickened by copolymerization of the ethylenically unsaturated components to form the sheet molding compound. The sheet molding compound can then be cut to the desired mold shape and molded under heat and pressure to form the fully cured product.

The sheet molding compound can also be formed by a spray-up method in which the catalyzed resin in liquid form and chopped fiber glass roving are sprayed or blown simultaneously onto a surface such as a polyethylene film and covering this with a second polyethylene film. Wetting of the glass fibers by the resin solution is obtained in flight. Kneading or compaction of the sprayed up material can be utilized, if necessary, to complete the wetting of the fibers and insure uniform distribution of the resin in the fiber. Whichever method is used for preparing the sheet molding compound, it is necessary that the reinforcing fibers be sufficiently long to give the final product adequate strength but not so long that they will interfere with the flow of the resin-fiber mixture in the mold during curing. Under the influence of the heat and pressure, the resin component will soften. If it does not soften enough due to too much anhydride-epoxy cross-linking, it will not flow properly in the mold. Or if the anhydride-epoxy reaction is too rapid at the molding temperature, the resin will gel in the mold before it has flowed sufficiently to fill out the mold. If the resin softens too much, it will flow away from the reinforcing fiber during molding.

As described, a suitable anhydride-accelerator must be used in order to obtain a satisfactory second stage cure, particularly when mold curing is utilized. In order to prepare the intermediate compound without substantial anhydride-epoxy reaction, the anhydride accelerator must be substantially inactive at the conditions required for the free-radical reaction including the time and temperature of the reaction. Furthermore, adequate control of active hydrogen must be effected to insure that substantial anhydride-epoxy reaction does not occur. Therefore, an anhydride accelerator is preferably used which is substantially free of active hydrogen. If the temperature of the free radical reaction is increased, a less active anhydride accelerator is used. The relative inactivity of the anhydrade accelerator in contrast with the activity of the free radical initiation is further emphasized when significant storage stability of the intermediate composition is desired. The anhydride accelerator functions by opening up the anhydride group for reaction with the epoxy group. This accelerator can suitably be a nitrogen containing anhydride accelerator, preferably a non-volatile liquid, which is incorporated into the initial reaction mixture in the amount of about 0.01 to about 10 weight percent, preferably about 0.1 to about 5 percent based on the resin components. Since the presence of an anhydride accelerator for the second stage anhydride-epoxide that may take place in the first-stage copolymerization procedure or during storage of the intermediae composition, its selection, particularly with respect to its activity and the amount used, must be carefully correlated with the other components and the conditions in the first-stage copolymerization to avoid a substantial amount of such anhydride-epoxy reaction in the first stage, as described above.

The preferred accelerators are tertiary nitrogen compounds particularly those in which one or more tertiary nitrogen atoms are in a ring structure including pyridine and its mono- and di-lower alkyl-substituted derivatives, N-lower alkyl-substituted imidazole, N-lower alkyl-substituted morpholine, N-lower alkyl-substituted piperidine, N,N-di-lower alkyl-substituted piperazine, and the like. Also included are the compounds containing tertiary nitrogen atoms in which the ring is attached to the nitrogen atom with one bond including N,N-di-lower alkylcyclohexylamine, benzyl di-lower alkylamine, benzyl tri-lower alkylammonium chloride and the like. We have further discovered that nitrogen containing anhydride accelerators can be used successfully in which there is labile hydrogen attached to the nitrogen, especially when used in minor amounts or with particular care, to avoid substantial anhydride-epoxy reaction in the copolymerization reaction, although the intermediate product containing these accelerators tends to be less storage stable. As used herein, lower alkyl includes methyl, ethyl, propyl, and butyl. The group of suitable anhydride accelerators includes morpholine; N-ethylmorpholine; N-aminopropylmorpholine; N,N-dimethylcyclohexylamine; dimethylamine; 3-picoline; melamine; diallylmelamine and the like; imidazoles such as imidazole; 1-methylimidazole; 2-methylimidazole; 2-ethylimidazole; 1,2-dimethylimidazole; and the like; benzyltrimethylammonium chloride, dicyandiamide, piperazine; piperidine; and the like. A solid accelerator, such as dicyandiamide, can be finely powdered and thoroughly incorporated throughout the resin mixture.

The intermediate compound can be cured at an elevated temperature of about 65° C. to about 220° C., preferably about 140° C. to about 190° C. for a sufficient time to effect cure, namely, about 30 seconds to about 24 hours. The molding pressure, when utilized, generally will be taken between 3 amd about 200 kg./cm$^2$ and preferably about 25 to about 100 kg./cm$^2$. The cure conditions are related in part to the resin composition including the particular accelerator that is used. For suitable molding the total combined content of the reinforcing fiber and filler should be no greater than about 80 percent of the total composition. When fiber glass reinforcement is used, it will comprise about 10 percent to about 80 percent, preferably about 20 percent to about 65 percent of the total composition. The filler will ordinarily be used in the range of about 5 percent to about 80 percent, preferably about 10 percent to about 40 percent of the total composition.

In the following description of specific embodiments of the invention, the polyanhydride was Arco Chemical Company SMA 2000 resin, a styrene-maleic anhydride copolymer having a styrene to maleic anhydride mol ratio of about 2:1 and a molecular weight of about 1,700. The fumed silica was Cab-O-Sil M-5, a fire-dry fumed silica with a nominal particle size of 0.012 microns manufactured by Cabot Corporation. The flexural strength was determined by ASTM D-790, the tensile strength by ASTM D-638 and the spiral flow was determined by ASTM D-3123-72.

EXAMPLE 1

Into a one liter blend was mixed 216.6 g. of styrene, 290.0 g. of phenyl glycidyl ether, 102.0 g. of maleic anhydride, and 212.4 g. of a styrene-maleic anhydride copolymer having a styrene to maleic anhydride mol ratio of about 2:1. The ingredients were blended at high speed until solution was evident. This solution of resin components was cooled and the viscosity was measured at 25° C. in a Brookfield viscometer and found to he 72 cps. This viscosity was increased with one percent of a fumed silica to an average reading of 707 cps. at 25° C. To 500 g. of this base resin were added 5 g. of 2,2'-azobis(2,4-dimethylvaleronitrile) and 1.25 cc. of 1-methylimidazole. A resin-fiber glass mixture was made by kneading 240 g. of the catalyzed base resin with 160 g. of 8 mm. copped Owens Corning Fiberglass 832 in a 10-inch by 20-inch polyethylene bag. This resin-fiber glass mixture was formed into a mat by rolling it out in the plastic bag to a mat of about 160 square inches. This A-stage resin fiber glass mat was B-staged in a 200° F. oven for 10 minutes. The B-staged product was flexible and handleable and was found to have a spiral flow in excess of 48 inches. The B-staged product was molded between heated plates at 325° F. for 10 minutes to a thickness of about one-eighth inch. This molded product was determined to have a flexural strengh of 10,207 psi. and a tensile strength of 2,580 psi.

EXAMPLE 2

The procedures and conditions of Example 1 were repeated in the preparation of a molding compound and a product molded therefrom using a different epoxy compound. The resin solution was prepared by blending 181.2 g. of styrene, 85.4 g. of maleic anhydride, 177.7 g. of the 2/1 copolymer of styrene and maleic anhydride and 355.7 g. of Cordura E Ester (Shell Chemical Company's glycidyl ester of a mixture of nine and eleven carbon carboxylic acids). Its 25° C. Brookfield viscosity of 64 cps. was adjusted to 431 cps. by the addition of one percent fumed silica. The free radical initiator, anhydride accelerator and fiber glass were incorporated in the same proportions. A 400 g. quantity of this material was B-staged as before to a pliable, handleable product having a spiral flow in excess of 48 inches. It was then molded to a product having a flexual strength of 8,930 psi. and a tensile strength of 2,760 psi.

EXAMPLE 3

The procedures and conditions of Example 1 were again repeated using another epoxy compound. The resin solution was prepared with 250.5 g. of styrene, 118 g. of maleic anhydride, 245.7 g. of the 2:1 styrene-maleic anhydride copolymer and 185.7 g. of epichlorohydrin. The 25° C. Brookfield viscosity of this resin solution was increased from 48 cps. to 572 cps. using one percent fumed silica. After mixing in the same free radical initiator, anhydride accelerator and fiber glass in the same proportions, a 400 g. sample was thickened to a pliable molding compound. This material was determined to have a spiral flow by the spiral flow test of 10 inches. The material was molded as before to a product having a flexural strength of 8,660 psi. and a tensile strength of 5,270 psi.

EXAMPLE 4

In this experiment styrene oxide was used in preparing a molding compound and a molded product using the same procedures and conditions as set out in Example 1 except as noted below. The resin solution was prepared from 234.3 g. of styrene, 110.4 g. of maleic anhydride, 229.8 g. of the 2:1 styrene-maleic anhydride copolymer and 225.5 g. of the styrene oxide. The 25° C. Brookfield viscosity of 62 cps. was increased to 232 cps. with one percent of the fumed silica. The same free radical initiator, anhydride accelerator and fiber glass were mixed in the same proportions as before. The 400 g. sample of this material was B-staged to a hard molding compound having a spiral flow of eight inches. This material required a preheat cycle of two minutes at 225° F. before it was molded as described in Example 1. The molded product had a flexural strength of 10,600 psi. and a tensile strength of 1,640 psi.

EXAMPLE 5

In this experiment n-butyl glycidyl ether was used as the epoxy compound in preparing a molding compound and a molded product by the procedures and conditions of Example 1. 251.3 g. of styrene, 107.6 g. of maleic anhydride, 224.1 g. of the same styrene-maleic anhydride polyanhydride and 239.8 g. of the n-butyl glycidyl ether were blended together to a solution having a Brookfield viscosity of 30 cps. at 25° C. After adding 1.5 g. of fumed silica to increase the viscosity to 200 cps., the same free radical initiator and anhydride accelerator were added in the same proportions and then the fiber glass was added, also in the same proportion. This material (400 g.) was thickened to a pliable molding compound which was determined to have a spiral flow greater than 48 inches. It was molded to a product having a flexural strength of 11,450 psi. and a tensile strength of 3,980 psi.

In like manner a thickened, moldable intermediate is produced when appropriate amounts, as described herein, of styrene, methylmaleic anhydride, a 1,2-epoxy octadecane, a 1:1 styrene-maleic anhydride copolymer and pyridine are heated to about 45° C. in the presence of t-butyl peroxypivalate. Also a thickened, moldable intermediate is produced when appropriate amounts of styrene, chloromaleic anhydride, 2,3-epoxy-2-phenylhexane, a 3:1 styrene-maleic anhydride copolymer and N-metnylpiperazine are heated to about 45° C. in the presence of 2-t-butylazo-2-cyano-4-methoxy-4-methypentane.

Many analyses of the thickened intermediate and the fully cured product involving styrene and maleic anhydride as the vinyl reactants and a polyepoxide have revealed no evidence of polystyrene notwithstanding the fact that a substantial molar excess of styrene to maleic anhydride was used in the initial resin mixture. Evidence strongly suggests that the excess styrene reacts with the styrene-maleic anhydride copolymer present in the mixture by graft polymerization forming relatively short styrene-based chains. There is also some evidence which indicates that during the first-stage reaction free styrene and free maleic anhydride disappear from the system in an approximate 1:1 molar ratio until the free maleic anhydride was fully reacted and following this any unreacted styrene reacted further until it was fully reacted.

Cured resins can be prepared by the procedure described herewith with excellent properties for a wide variety of uses. The reinforced molded products possess exceptional mechanical properties including exceptionally high tensile and flexural strength and excellent retention of these properties at elevated temperatures. The electrical characteristics are excellent including the retention of the electrical properties upon exposure to moisture and heat. The reinforced thickened compositions can be readily compression molded into complex, detailed shaped with exceptionally uniform glass fiber distribution throughout at comparatively short cure times.

It is to be understood that the above disclosure is by way of specific example and that numerous modifications and variations are available to those of ordinary skill in the art without departing from the true spirit and scope of the invention.

We claim:

1. A method of forming a handleable, thermosettable composition which comprises forming a homogeneous liquid resin mixture substantially free of active hydrogen comprising (a) about five to about 80 weight percent based on the total resin components of an olefinically unsaturated monomer selected from styrene, ring-substituted chloro-, bromo or lower alkylstyrenes, lower alkylacrylates, lower alkylmethacrylates, vinyl acetate, acrylonitrile, vinyl chloride, vinyl bromide and vinylidene chloride, and mixtures thereof, (b) an anhydride component consisting of (1) an olefinically unsaturated monoanhydride selected from maleic anhydride, chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride, chloromethylmaleic anhydride, bromophenylmaleic anhydride and itaconic anhydride, the molar ratio of the olefinically unaturated monomer (a) to the olefinically unsaturated monoanhydride being from about 0.5:1 to about 8:1;

(2) a saturated polyanhydride comprising the copolymer having between two and about 500 repeating units and prepared from one to 10 mols of said olefinically unsaturated monomer (a) per mol of said unsaturated monoanhydride (b) (1) or prepared from equimolar amounts of said unsaturated monoanhydride (b) (1) and one or more two to 20 carbon 1-alkenes or halogen-substituted 1-alkenes; and (3) a saturated monoanhydride selected from phthalic anhydride, hexahydrophthalic anhydride, methyltetrahydrophthalic anhydride, dodecenylsuccinic anhydride, chlorendic anhydride, and a mixture of methyl bicyclo (2.2.1)heptane-2,3-dicarboxylic anhydride isomers;

(4) the ratio of the anhydride equivalents of said olefinically unsaturated monoanhydride (1) to the sum of the total anhydride equivalents in the resin solution being from about 0.2:1 to about 1:1 and the ratio of anhydride equivalents in said saturated polyanhydride (2) to the anhydride equivalents in said saturated monohydride (3) being at least about 1:1;

(c) an epoxy component substantially free of active hydrogen consisting of (1) a saturated monoepoxy compound having between three and about 20 carbon atoms, and (2) an epoxy resin having a 1,2-epoxy equivalent value greater than one which is soluble in the resin solution or is capable of forming a homogeneous dispersion in the resin solution, (3) the ratio of epoxy equivalents in the monoepoxy compound to the epoxy equivalents in the epoxy resin being greater than 1:1 and an A/E ratio of total anhydride equivalents to total energy equivalents in the resin solution of about 0.1:1 to about 2.5:1; and (d) from about 0.01 to about 10 weight percent of an anhydride accelerator which is substantially inactive during the copolymerization reaction of said olefinically unsaturated monomer (a) and said anhydride (b); and copolymerizing said olefinically unsaturated monomer (a) with said anhydride component (b) by free radical means at a temperature up to about 150° C. without substantial reaction of the anhydride groups with the epoxide present in the resin mixture whereby a handleable, thermosettable composition comprising a homogeneous mixture of polyanhydride molecules, epoxide molecules and anhydride accelerator is obtained.

2. A method of forming a handleable, thermosettable composition in accordance with claim 1 in which a fibrous substrate is incorporated into said homogeneous liquid resin mixture.

3. A method of forming a handleable, thermosettable composition in accordance with claim 1 in which a powdered inert filler is incorporated into said homogeneous liquid resin mixture.

4. A method in accordance with claim 1 in which the liquid resin mixture contains from about 10 to about 60 weight percent of said olefinically unsaturated monomer (a), the mol ratio of said olefinically unsaturated monomer (a) to the olefinically unsaturated monoanhydride (b) (1) is between about 1:1 and about 4.5:1, the said ratio of anhydride equivalents of said olefinically unsaturated monoanhydride (b) (1) to the sum of the total anhydride equivalents (b) in the resin solution is from about 0.4:1 to about 0.9:1, and the A/E ratio is between about 0.3:1 and about 1.5:1.

5. A method in accordance with claim 1 in which the liquid resin mixture contains from about 15 to about 50 weight percent of said olefinically unsaturated monomer (a), the mol ratio of said olefinically unsaturated monomer (a) to the olefinically unsaturated monoanhydride (b) (1) is between about 1:1 and about 3:1, the said ratio of anhydride equivalents of said olefinically unsaturated monoanhydride (b) (1) to the sum of the total anhydride equivalents (b) in the resin solution is from about 0.5:1 to about 0.8:1 and the A/E ratio is between about 0.5:1 and about 1.5:1.

6. A method of forming a handleable, thermosettable composition which comprises forming a homogeneous liquid resin mixture substantially free of active hydrogen comprising
(a) about five to about 80 weight percent styrene based on the total resin components;
(b) an anhydride component consisting of
(1) maleic anhydride in a molar ratio of styrene to maleic anhydride of about 0.5:1 to about 8:1;
(2) a styrene-maleic anhydride copolymer having between two and about 500 repeating units and a styrene to maleic anhydride ratio between about 1:1 and 10:1; amd
(3) a saturated monoanhydride selected from phthalic anhydride, hexahydrophthalic anhydride, methyltetrahydrophthalic anhydride, dodecenylsuccinic anhydride, chlorendic anhydride, and a mixture of methyl bicyclo(2.2.1)heptane-2,3-dicarboxylic anhydride isomers;
(4) the ratio of anhydride equivalents of said maleic anhydride to the sum of the anhydride equivalents in the anhydride component (b) being between about 0.2:1 and about 1:1 and the ratio of anhydride equivalents in said styrene-maleic anhydride copolymer to the anhydride equivalents in said saturated monoanhydride (3) being at least about 1:1;
(c) an epoxy component substantially free of active hydrogen consisting of
(1) a saturated monoepoxy compound having between three and about 20 carbon atoms, and
(2) an epoxy resin having a 1,2-epoxy equivalent value greater than one which is soluble in the resin solution or is capable of forming a homogeneous dispersion in the resin solution,
(3) the ratio of epoxy equivalents in the monoepoxy compound to the epoxy equivalents in the epoxy resin being greater than 1:1 and an A/E ratio of total anhydride equivalents to total epoxy equivalents in the resin solution of about 0.1:1 to about 2.5:1; and
(d) from about 0.01 to about 10 weight percent of an anhydride accelerator which is substantially inactive during the copolymerization reaction of said styrene with said anhydride component (b); and
copolymerizing said styrene with said anhydride component (b) by free radical means at a maximum temperature up to about 150° C. to form styrene-maleic anhydride copolymer and without substantial reaction of the anhydride groups with epoxy groups presemt in the resin mixture does not take place whereby a handleable, thermosettable, moldable composition comprising a homogeneous resin mixture of sytrene-maleic anhydride copolymer molecules, epoxy molecules and anhydride accelerator is obtained.

7. A method of forming a handleable, thermosettable composition in accordance with claim 6 in which a fibrous substrate is incorporated into said homogeneous liquid resin mixture.

8. A method of forming a handleable, thermosettable composition in accordance with claim 6 in which a powered inert filler is incorporated into said homogeneous liquid resin mixture.

9. A method in accordance with claim 6 in which the ratio of styrene (a) to maleic anhydride (1) is about 1:1 to about 4.5:1; the ratio of styrene to maleic anhydride in the styrene-maleic anhydride copolymer (2) is about 1:1 to about 3:1, the said anhydride equivalent ratio of anhydride equivalents of said maleic anhydride (1) to the sum of the anhydride equivalents in the anhydride component (b) is from babout 0.4:1 to about 0.9:1, and the polyepoxide is a diglycidyl ether of bisphenol A at an A/E ratio of about 0.3:1 to about 1.5:1.

10. A method in accordance with claim 6 in which the ratio of styrene (a) to maleic anhydride (1) is about 1:1 to about 3:1, the saturated anhydride component is styrene-maleic anhydride copolymer, the ratio of styrene to maleic anhydride in the styrene-maleic anhydride copolymer (2) is about 1:1 to about 3:1, the said anhydride equivalent ratio of anhydride equivalents of said maleic anhydride (1) to the sum of the anhydride equivalents in the anhydride components (b) is from about 0.5:1 to about 0.8:1, and the epoxy component is a polyepoxide consisting of a diglycidyl ether of bisphenol A at an A/E ratio of about 0.5:1 to about 1.3:1.

11. A handleable, thermosettable composition which comprises a homogeneous resin mixture of polyanhydride molecules, polyepoxide molecules of an epoxy resin having a 1,2-epoxy equivalent value greater than 1, a saturated monoanhydride, a saturated monoepoxy compound having between three and about 20 carbon atoms and from about 0.01 to about 10 weight of an anhydride accelerator,
said polyanhydride comprising the addition copolymer of (1) styrene and (2) maleic anhydride in a molar ratio of styrene (1) to maleic anhydride (2) of about 0.5:1 to about 8:1 and (3) a styrene-maleic anhydride copolymer having between two and about 500 repeating units and a styrene to maleic anhydride ratio between about 1:1 and about 10:1;
said saturated monoanhydride selected from phthalic anhydride, hexahydrophthalic anhydride, methyltetrahydrophthalic anhydride, dodecenylsuccinic anhydride, chlorendic anhydride and a mixture of methyl bicyclo(2.2.1)heptane-2,3-dicarboxylic anhydride isomers;

the ratio of anhydride equivalents derived from said maleic anhydride (2) to the total sum of the anhydride equivalents in said homogeneous resin mixture being between about 0.2:1 and about 1:1 and the ratio of anhydride equivalents in said saturated monoanhydride to the anhydride equivalents derived from said styrene-maleic anhydride copolymer (3) being between zero and about 1:1;

the A/E ratio of total anhydride equivalents to total epoxy equivalents in said composition being between about 0.1:1 to about 2.5:1 and the ratio of epoxy equivalents in the said monoepoxy compound to the epoxy equivalents in the said epoxy resin being greater than 1:1; and said composition being substantially free of any volatile component.

12. A handleable, thermosettable composition in accordance with claim 11 having a fibrous substrate incorporated in said composition.

13. A handleable, thermosettable composition in accordance with claim 11 having a powdered inert filler incorporated in said composition.

14. A handleable, thermosettable composition in accordance with claim 11 having glass fibers of from about 3 mm. to 50 mm. in length and a powdered inert filler incorporated in said composition.

15. A handleable, thermosettable composition in accordance with claim 11 having a melt viscosity sufficient during compression molding to permit the resin mixture to flow and fill the mold at the molding conditions and produce a uniform distribution of the components in the cured resin.

16. A handleable, thermosettable composition in accordance with claim 15 in which said melt viscosity is provided by a controlled number of anhydride-epoxy bonds in said resin insufficient to form a gel.

17. A handleable, thermosettable composition in accordance with claim 11 in which the ratio of styrene (1) to maleic anhydride (2) is about 1:1 to about 4.5:1, the ratio of styrene to maleic anhydride in the styrene-maleic anhydride copolymer (3) is about 1:1 to about 3:1, the said ratio of anhydride equivalents derived from said maleic anhydride (2) to the total sum of the anhydride equivalents in said homogeneous resin mixture is from about 0.4:1 to about 0.9:1, and the A/E ratio is about 0.3:1 to about 1.5:1.

18. A handleable, thermosettable composition in accordance with claim 11 in which the ratio of styrene (1) to maleic anhydride (2) is about 1:1 to about 3:1, the ratio of styrene to maleic anhydride in the styrene-maleic anhydride copolymer (3) is about 1:1 to about 3:1, the said ratio of anhydride equivalents derived from said maleic anhydride (2) to the total sum of the anhydride equivalents in said homogeneous resin mixture is from about 0.5:1 to about 0.8:1 and the polyepoxide is a diglycidyl ether of bisphenol A at an A/E ratio of about 0.5:1 to about 1.3:1.

19. A handleable, thermosettable composition in accordance with claim 11 in which the ratio of styrene (1) to maleic anhydride (2) is about 2:1, the ratio of styrene to maleic anhydride in the styrene-maleic anhydride copolymer (3) is about 2:1, and the said ratio of anhydride equivalents in said saturated momoanhydride to the anhydride equivalents derived from said styrene-maleic anhydride copolymer (3) is zero.

* * * * *

UNITED STATES PATENT OFFICE
CERTIFICATE OF CORRECTION

Patent No.  4,097,448        Dated  June 27, 1978

Inventor(s)  William J. Heilman, Frank C. Peterson, Mical C. Renz and Leslie P. Theard It is certified that error appears in the above-identified patent and that said Letters Patent are hereby corrected as shown below:

Col. 6, lines 16 and 17, delete "-alkenes," and insert --the--;
    line 18, "1-alienes" should read --1-alkenes--;
    line 21, "chlorohexane-1," should read --chlorohexene-1,--.
Col. 7, line 29, after "monoepoxy" insert --compounds are also useful herein. The saturated monoepoxides--.
Col. 11, line 54, "moving" should read --roving--.
Col. 13, line 48, "blend" should read --blender--.
    line 49, "290.0" should read --269.0--.
Col. 15, line 21, "N-metnyl" should read --N-methyl--.
Col. 16, line 12, "unaturated" should read --unsaturated--; line 51, "energy" should read --epoxy--; line 58, after "hydride" insert --component--; line 63, after "epoxide" insert --groups--.
Col. 17, line 42, insert --about-- before "10:1" and "amd" should read --and--; line 52, "betwen" should read --between--.
Col. 18, line 11, insert --the-- after "with"; line 11, "presemt" should read --present--; line 14, "sytrene" should read --styrene--; line 33, "babout" should read --about--; line 44, "components" should read --component--; line 54, "weight" should read --weight percent--.
Col. 20, line 31, "momoanhydride" should read --monoanhydride--.

Signed and Sealed this

Fifteenth Day of May 1979

[SEAL]

Attest:

RUTH C. MASON
Attesting Officer

DONALD W. BANNER
Commissioner of Patents and Trademarks